(12) United States Patent
Guerra et al.

(10) Patent No.: US 12,299,180 B1
(45) Date of Patent: May 13, 2025

(54) SYSTEMS AND METHODS FOR MANAGING DATA FROM THIRD-PARTY DEVICES

(71) Applicant: United Services Automobile Association (USAA), San Antonio, TX (US)

(72) Inventors: Oscar Guerra, San Antonio, TX (US); Dustin Bowen Bitter, Lehi, UT (US); Nikhil Dama, Apex, NC (US); Donald Nathaniel Holloway, III, San Antonio, TX (US); Megan Sarah Jennings, San Antonio, TX (US); Pooja Krishnaswamy, McKinney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 289 days.

(21) Appl. No.: 17/710,611

(22) Filed: Mar. 31, 2022

(51) Int. Cl.
*G06F 21/64* (2013.01)
*G06F 16/22* (2019.01)
*G06F 21/62* (2013.01)
*H04L 67/12* (2022.01)

(52) U.S. Cl.
CPC ............ *G06F 21/645* (2013.01); *G06F 16/22* (2019.01); *G06F 21/62* (2013.01); *H04L 67/12* (2013.01)

(58) Field of Classification Search
None
See application file for complete search history.

(56) References Cited

U.S. PATENT DOCUMENTS

2011/0247069 A1*  10/2011  Slater ................... G06F 21/577
                                                                    726/22
2019/0043341 A1*  2/2019  Wouhaybi .............. G16H 10/60

* cited by examiner

Primary Examiner — Scott B Christensen
(74) Attorney, Agent, or Firm — Fletcher Yoder P.C.

(57) ABSTRACT

A data management system may include a monitoring device comprising a sensor, a memory storing executable instructions, and a processor. The sensor may generate sensor data and transmits the sensor data to a third-party system. The processor may receive the sensor data from the third-party system and associate the sensor data with a user account. The user account may include additional sensor data from other monitoring devices and such that the sensor data together with the additional sensor data comprises aggregated sensor data. The processor may determine a risk value of the aggregated sensor data is greater than a risk threshold and flag the user account in response to determining the risk value of the sensor data is greater than the risk threshold. The processor may also transmit a signal indicative of the flagged user account to an application of a user device.

13 Claims, 5 Drawing Sheets

SYSTEMS AND METHODS FOR MANAGING DATA FROM THIRD-PARTY DEVICES

BACKGROUND

The present disclosure relates generally to systems and methods related to management of data generated by third-party devices. More specifically, the present disclosure relates to management of data of a third-party device owner that is generated by a third-party device.

Third-party devices may include smart devices that use sensors to monitor the environment of a customer and that send data to a third-party. For example, the customer may own multiple third-party devices (e.g., smart home devices, wearables, security systems) that generate data in real-time or near real-time and store the data in a remote server that is accessible by a manufacture of the third-party device. While third-party devices may empower the owner to better understand their environment, the aggregation of data from multiple third-party devices may create privacy and security risks. As such, improved systems and methods for managing and protecting the data of third-party customers or owners are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more monitoring devices associated with one or more third-party systems. The one or more monitoring device may include a sensor that may generate sensor data and send the sensor data to the one or more third-party systems. The system may also include a memory storing executable instructions and a processor. The processor may receive user information based on a relationship between a user and the one or more monitoring devices and request the sensor data. The processor may receive the sensor data from the one or more third-party systems after a threshold amount of time has expired from a generation of the sensor data for storage in the data privacy management system and analyze the sensor data to determine one or more risk values. The processor may then output an indication to the one or more third-party systems indicative of instructions to purge the sensor data based on the one or more risk values.

In another embodiment, a system may include a monitoring device with a sensor that may generate sensor data and transmits the sensor data to a third-party system. The system may also include a memory storing executable instructions and a processor. The processor may receive the sensor data from the third-party system and associate the sensor data with a user account. The user account may include additional sensor data from other monitoring devices such that the sensor data together with the additional sensor data may create aggregated sensor data. The processor may also determine a risk value of the aggregated sensor data is greater than a risk threshold and flag the user account in response to determining the risk value of the sensor data is greater than the risk threshold. The processor may then transmit a signal indicative of the flagged user account to an application of a user device.

In yet another embodiment, a method may include receiving, via a processor, sensor data from a third-party system associated with a monitoring device, wherein the monitoring device comprises a sensor configured to generate the sensor data from an environment of the sensor. The monitoring device may transmit the sensor data to a third-party system. The method may also include associating the retrieved sensor data with a user account of the system and analyzing the sensor data based on one or more attributes of the user account. The method may then include determining that a privacy risk level is greater than a privacy tolerance level based on the analyzing and encrypting the retrieved sensor data in response to determining the privacy risk level is greater than the privacy tolerance level. The method may also include storing the encrypted, retrieved sensor data in a database and outputting a signal to the third-party system to cause the third-party system purge the sensor data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
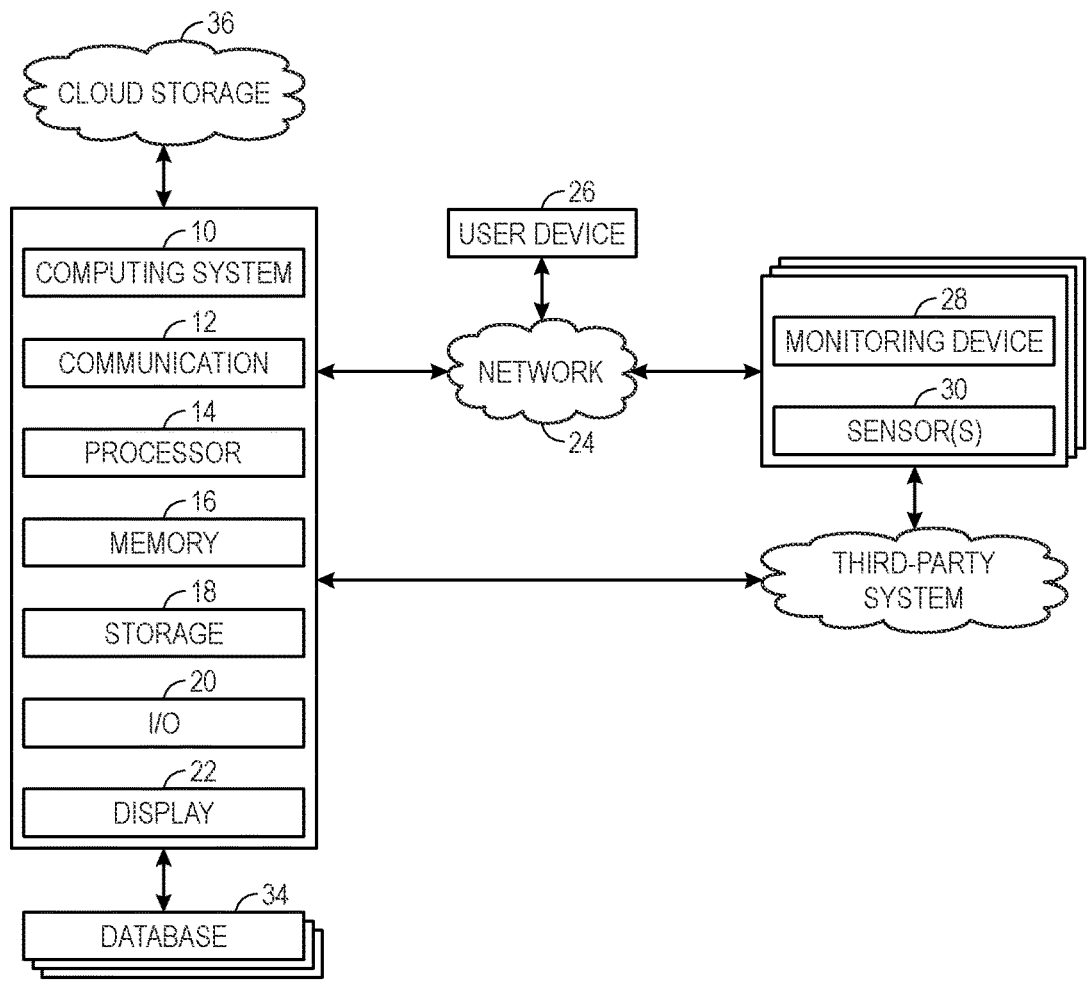
FIG. 1 is a schematic illustration of an environment in which a data management system may operate, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM).

As used herein, machine learning may refer to algorithms and statistical models that computer systems may use to perform a specific task with or without using explicit instructions. For example, a machine learning process may generate a mathematical model based on a sample of clean data, known as "training data," in order to make predictions or decisions without being explicitly programmed to perform the task. In another example, the machine learning process may use image analysis to determine objects of interest based on a sample of clean data or based on preferences by a user, in order to make predications or decisions being explicitly programmed to perform the task.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed towards a data management system for data (e.g., personal data or private data) generated by a third-party device. The system may, in an embodiment, provide an arm's length relationship between a user, owner, or customer of third-party devices, generally referred to herein as a user, and a respective third-party associated with the device, which may be a manufacturer of the third-party device, an entity that is associated with the manufacturer of the third-party device or that directly or indirectly receives third-party device data and that is not associated with the owner of the device. For example, rather than directly purchasing the third-party device or services associated with the third-party device, a user can contract with the data management system to purchase the third-party device and manage associated services, purchases, and subscriptions. The data management system may be managed by an organization with higher privacy standards than the third-party device supplier. For example, the data management system may be associated with a bank or financial institution. The data management system may further encrypt or tokenize the subscription and allow the user to access the subscriptions through a secure portal. As such, the user may not directly interact with the third-party and instead allow the data management system to facilitate such interactions. The arm's length relationship may provide anonymity and improved privacy for the user of the third-party device.

The data management system may also manage the customer storage of data generated by the third-party devices. The user may use the data management system to indicate certain preferences (e.g., settings), such as a schedule of data collection, deletion, or analysis. The data management system may retrieve and analyze data collected by the third-party devices to determine if the user may be exposed to any privacy or security risks. For example, the third-party device may continuously generate data regarding the user and/or their property or environment. In certain embodiments, the third-party device may transmit the data to the remote server of the third-party. The data management system may retrieve the data then delete the data from the remote server to limit a number of storage locations. In other embodiments, the third-party device may directly transmit the data to the data management system for storage. In an embodiment, the data management system can receive a duplicate set of the data generated by the third-party device or devices.

It may be important to manage data generated by third-party devices to ensure that certain information is kept restricted to a limited number of people. As such, the data management system may retrieve and store data within the system to minimize the number of storage locations and limit access to the data. The data management system also analyze the data to determine presence of privacy or security risks. In certain embodiments, aggregation of data generated by different devices may result in personally identifying information (PII) becoming revealed or expose the owner to other privacy and security concerns. Accordingly, the data management system may minimize these risks by continuously managing and analyzing data collected by the third-party devices.

With the preceding in mind, FIG. 1 illustrates an example environment in which a data management system is communicatively coupled to a number of data sources. The system may include a computing system 10 communicatively coupled to a variety of data sources that may assist the computing system 10 in managing and analyzing data for a user. Data from the variety of data sources may include, but is not limited to image or video data (e.g., security footage, photos), location data (e.g., Global Positioning System (GPS)), sound data (e.g., voice recordings, voice requests), physical or quantitative data (e.g., temperature, air quality, electrical usage), biometric data (e.g., health, fitness), and the like. The computing system 10 may include various types of components that may assist the computing system 10 in performing various types of computer tasks and operations. For example, the computing system 10 may include a communication component 12, a processor 14, a memory 16, a storage 18, an input/output (I/O) port 20, a display, and the like.

The communication component 12 may be a wireless or wired communication component that may facilitate communication between the computing system 10 and various other computing systems and devices via a network, the Internet, Bluetooth, or the like. For example, the communication component 12 may allow the computing system 10 to obtain the data from the variety of data sources, such as user devices 26 (e.g., smart phones, laptops, tablets), monitoring devices 28 (e.g., Internet-of-Things device), databases 34, cloud storages 36, or any suitable storage component. The communication component 12 may receive and send notifications to the monitoring devices 28 or the user devices 26 via the network. The communication component 12 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 14 may process instructions for execution within the computing system 10. The processor 14 may include single-threaded processor(s), multi-threaded processor(s), or both. The processor 14 may process instructions stored in the memory 16. The processor 14 may also include hardware-based processor(s) each including one or more cores. The processor 14 may include general purpose processor(s), special purpose processor(s), or both. The processor 14 may be communicatively coupled to other internal components (such as the communication component 12, the storage 18, the I/O ports 20, and the display 22).

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10. It should be noted that the components described above with regard to the computing system 10 are examples. Indeed, the computing system 10 may include additional or fewer components relative to the illustrated embodiment.

In certain embodiments, the computing system 10 may be communicatively coupled to a network 24, which may include collections of computing systems, the Internet, an Intranet system, or the like. The network 24 may facilitate communication between the computing system 10 and various other data sources. For example, the network 24 may be communicatively coupled to the user device 26 (e.g., smart phone, tablet, laptop). For example, a user may interact with the computing system 10 via an embedded application on the user device 26, or a web application. The user device may include a laptop that enables the user to access a portal of the data management system to view their information, such as active subscriptions or third-party devices. The portal may allow the user to manage (e.g., cancel, pay, add, adjust) their subscriptions with third-parties, view stored user data, and create insights with the data. In certain embodiments, the user device 26 may include a smart phone that enables the user to generate data (e.g., image data, sound data, behavior data). The user device 26 may store the data on the device 26 or transmit the data to the computing system 10 via the network.

In other embodiments, the network 24 may communicatively couple the computing system 10 and the monitoring devices 28 via the network 24. The network 24 may allow communication by Bluetooth, Zigbee, Z-wave, LoRa, NB-IoT, Cat MI, or the like. The network 24 may facilitate direct communication between the computing system 10 and the third-party devices, illustrated as monitoring devices 28. For example, the network 24 may be communicatively coupled to the monitoring devices 28 or the sensors 30. For example, the monitoring devices 28 may include third-party devices, such as smart home devices and appliances, digital assistants, or home security systems, with one or more sensor(s) 30 configured to generate data about an environment (e.g., property, room, office). In another example, the monitoring devices 28 may include wearable devices, such as activity trackers, smart watches, health monitoring devices, or fitness devices that generates data about its wearer (e.g., user, pet). In some embodiment, as described herein, the monitoring device 28 may also include the user device 26 which may collect data (e.g., image data, biometric data, sound data) about the user. For example, the user device 26 may be a smartphone that generates or creates health data (e.g., sleep data, steps per data), voice data (e.g., voice requests, voice memos), and image data (e.g., photos, videos) about the user. In some embodiments, the network 24 may also be communicatively to one or more databases 34, which may store data from the monitoring devices 28. In other embodiments, the network 24 may be further be communicatively coupled to one or more cloud storages 36, which may store additional information received from the monitoring devices 28. In some embodiments, the monitoring devices 28 be associated with a third-party system 32 and the devices 28 may transmit the data via the network 24.

The computing system 10 may be communicatively coupled to the third-party system 32. The third-party system 32 may include a cloud network, a database, or a server that stores data from the monitoring devices 28. The third-party system 32 may associate the received data with a user information (e.g., user account). For example, the monitoring device 28 may be a Honeywell Home Smart Thermostat that transmits data about the user to a third-party system 32, such as a server managed by Honeywell for storage. In another example, the monitoring device 28 may be a Garmin Watch that transmits data about the user to the third-party system 32 and to an application (e.g., NikeRun, Strava, MapMyRun) on the user device 26. In certain embodiments, the computing system 10 may communicate with the third-party system 32 to access and retrieve the data for storage in the database 32 or cloud storages 36. The computing system 10 may further purge (e.g., delete, encrypt) the data from the third-party system 32 to limit the number of storage locations with the data. The computing system 10 may perform these functions with machine learning algorithms or other machine-executable code stored in the processor.

Although the monitoring devices 28 are described as being communicatively coupled to the computing system 10 via the network 24, it should also be noted that, in other embodiments, the monitoring devices 28 may be communicatively coupled directly to the computing system 10 and/or the third-party system 32. As such, the monitoring devices 28 may provide data to the computing system 10 in real-time or near-real time to enable the computing system 10 to efficiently perform the operations described herein.

Figure 2:
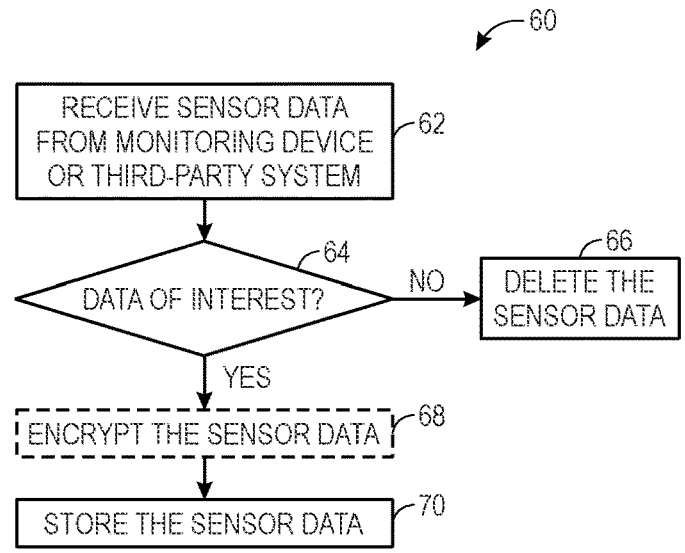
FIG. 2 is a flow diagram of an example process of managing data within the data management system, in accordance with an embodiment.

With the foregoing in mind, FIG. 2 illustrates an example process 60 for managing data (e.g., sensor data) generated by the monitoring devices 28. The data management system (e.g., computing system 10) may perform operations described below via the processor 14 based on processor-executable code stored in the memory 16 and the storage 18. The processor 14 may execute the processor-executable code to analyze the data and determine if the data may contain objects of interest. Based on determination and analysis, the processor 14 may communicate with the data management system to encrypt or store the data.

At block 62, the data management system may receive data (e.g., sensor data) from the monitoring device 28 or the third-party system 32. In an embodiment, the monitoring devices 28 may store data within a memory of the device 28. For example, the monitoring device 28 may be a smart watch that stores a limited amount of data (e.g., biometric data, workouts, heart rate, voice recordings) on the watch for the user to access. In another embodiment, the monitoring devices 28 may transmit the data to the third-party system 32 for storage or analysis. For example, the smart watch may transmit the data to a server for storage. The smart watch may retrieve the data when requested by the user and display the data a display of the smart watch. As such, the data management system may access the server to obtain data for storage within the system. Accordingly, the data management system may further purge the data from the server to limit the amount of data available in different systems.

At block 64, the data management system may determine whether the data retrieved at block 62 contains objects of interest. That is, the data management system may use machine learning techniques or image analysis to determine if the data contains objects relevant to the user. The objects of interest may include biometric data, certain attributes of the user, such as a face, a voice sound, a GPS location, or the like. The objects of interest may be designated by the user through the portal of the data management system or determined by the system. For example, the data management system may determine that a face of the user or an item of the user may be an object of interest. If the data includes the face of the user, the data management system may determine that the data includes an object of interest. If the data includes identifiable motion of a tree branch blowing in the wind, the data management system may determine that the tree branch may not be an object of interest. In another example, the data may be a voice record of the user talking to themselves or to a guest, meaning the user may not be making a request (e.g., asking a question) to the monitoring devices 28. The data management system may determine that there are no objects of interest since the user may not be communicating with the monitoring devices 28. As such, at block 66, the data management system may delete the data from storage. In certain embodiments, the computing system 10 may also confirm the deletion by providing an indication through the portal or an application on the user device 26. In this way, the data management system may manage the quality and quantity of data in a storage component (e.g., database 34, cloud storage 36) of the system. Indeed, the data management system may filter through the data to manage the data to save storage space and improve system operations.

In other embodiments, the data management system may analyze the data and determine one or more object(s) of interest. For example, the data may be the video recording of a door and include a face of user, a license place of a car, and a timestamp. The data management system may identify the face and the license plate as objects of interest to the user.

At block 68, the data management system may encrypt or obscure the data in response to determining the presence of objects of interest. In an embodiment, the data management system may obscure certain attributes within the data. For example, the user may not want their face present in the data to maintain privacy. The data management system may obscure (e.g., blur, censor) face in the data using machine learning or image analysis techniques. In another embodiment, the computing system 10 may encrypt the data to protect the confidentiality of the user. For example, the data management system may encrypt the video data to limit the number of people who can view the face and the license plate. In another example, the data may be biometric data from a wearable device, which may include personally identifiable information (PII). The data management system may determine all biometric data to be objects of interest and encrypt the data before storage. Additionally or alternatively, the user may set certain preferences to require encryption of all before storage. As such, the data management system may encrypt the data and provide a key to the user. Accordingly, the computing system 10 may manage the security of the data.

In certain embodiments, the data management system may store the data in the storage components (e.g., databases, cloud storage) of the system. As described herein, the data management system may include one or more databases 32 and cloud storages 36 that store additional data regarding the user. For example, the data management system may associate the data with a user account in the cloud storage 36. The data management system may indicate to the user that new data has been added to their user account through the portal or the application on the user device 26. Accordingly, the data management system may manage the collection and storage of data on behalf of the user.

Although the example process described in FIG. 2 is described in a particular order, it should be noted that the example process 60 may be performed in any suitable order and is not limited to the order presented herein. It should also be noted that although each processing block is described below is the example process 60 as being performed by the data management system (e.g., computing system 10), other suitable computing systems may perform the process described herein.

Figure 3:
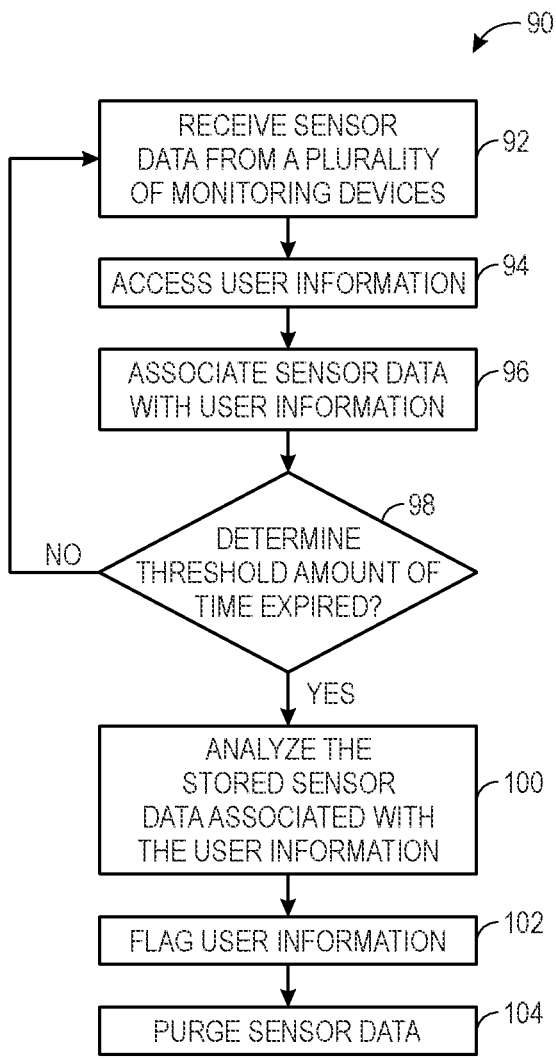
FIG. 3 is a flow diagram of an example process of managing data within the data management system, in accordance with an embodiment.

FIG. 3 illustrates an example process 90 for managing the data generated by monitoring devices 28. The data management system may receive data that contains sensitive information of the user, the property, or their habits from multiple monitoring devices 28. The generation and aggregation of data from multiple sources (e.g., monitoring devices 28) may create privacy and security risks for the user. As such, it may be beneficial for the data management system to receive or retrieve data, analyze the data, and determine an overall privacy risk associated with the data. The data management system (e.g., computing system 10) may perform operations described below via the processor 14 based on processor-executable code stored in the memory 16 and the storage 18. The processor 14 may execute the processor-executable code to analyze the data and determine the presence of privacy or security risks. Based on determination and analysis, the processor 14 may communicate with the data management system to flag a user account and purge the data from storage.

At block 92, the data management system may receive data from a plurality of monitoring devices 28. The monitoring devices 28 may capture data regarding the property and the user and transmit it in real-time to the data management system via the network 24. For example, a smart home device may generate data and transmit the data to the system in real-time. As such, the data management system may be the only storage location of the data. In other embodiments, the monitoring devices 28 may transmit the data to the third-party system 32 and the data management system may retrieve the data from the third-party system 32. For example, the plurality of monitoring devices 28 may include a fitness tracker that generates biometric data about the wearer, such as heart rate, sleeping data, or walking data. The smart watch may also generate location data (e.g., GPS) about the wearer and associate it with a user identifier (e.g., username). The data of the smart watch may be stored on the watch, in an associated application on the user device 26, in a third-party system 32, or any suitable storage component. As such, the data management system may access the monitoring devices 28 or the third-party system 32 to retrieve the data. Still in another example, the monitoring devices 28 may include a smart phone that generates audio data, image or video data, location data about the user during their everyday life. The user may use voice prompts on the smart phone to ask questions, take notes, or call contacts. The user may also use the smart phone to track an outdoor exercises with a third-party application (e.g., Nike Run, Strava, MapMyRun) on the smart phone and an account associated with the third-party. As such, the data management system may access the monitoring device 28 or the third-party server 32 to retrieve the data. Accordingly, the plurality of monitoring devices 28 may generate various types of data that may be stored within the device 28, the data management system, and/or the third-party system 32.

At block 94, the data management system may access user information in response to receiving data. The user information may include a user account created by the user, list of monitoring devices 28 owned by the user, or user preferences indicated by the user through the portal of the data management system. For example, the user may acquire new smart home devices and notify the data management system by updating their user information (e.g., user account) to include the new devices. The user account may further include user preferences or settings indicated by the user. The settings may be factors for data management and storage, such as a cadence of data collection, a time interval, a threshold privacy value, one or more encryption or obscuring settings, an amount of data storage, or the like. The data management system may access the user information to determine a user account and/or determine a management technique for the data. That is, the user information may indicate that certain data may be encrypted or obscured before storage. In another example, the user may also set a cadence for collecting and storing data before analysis. In another example, the user information may be an account associated with the third-party system 32 that the data management system created on behalf of the user. That is, the data management system may access the account in the third-party system 32 to retrieve data created by the monitoring device 28 regarding the user.

At block 96, the data management system may associate the data received at block 92 with the user information. That is, the data management system may manage the data according to the user information. For example, the data management system may store the data with the user account within the storage components. In another example, the data management system may first encrypt or obscure the data before storing the data in the system. For example, the user may set a preference for all fitness data to be encrypted before storage. In another example, the user may want to obscure the faces of children identified in the data to limit presence of children and protect the privacy of the children. As such, the data management system may first encrypt or obscure the data before storage. As the monitoring devices 28 continue to generate data, the storage components may get crowded and/or run out of space for additional data. In certain embodiments, the user information may indicate management of data within the third-party system 32. For example, the user may prefer data to be deleted from the third-party system 32 after the data management system retrieves it. In another example, the user may indicate that a limited amount of data (e.g., one month's data collection) may remain in the third-party system 32 for optimal operation of the monitoring devices 28. As such, the data management system may communicate with the third-party system 32 to manage the data stored on a server of the third-party system 32.

At block 98, the data management system may determine whether a threshold amount of time has expired since the system has analyzed the data. As mentioned above, the data management system may collect and store data in the databases 34, the cloud storages 36, or any suitable storage component. In some embodiments, the data management system may prompt the user to set the threshold amount of time through the portal or the application on the user device 26. For example, the user may want data to be analyzed every six months for privacy or security risks. As such, the user may indicate this preference in their user account. The threshold amount of time may be edited (e.g., changed) by the user at any time to be longer or shorter. In other embodiments, the data management system may determine the threshold amount of time based on the cadence of data collection, a storage capacity of the storage components, the type of data, by machine learning techniques, or the like. For example, the data management system may determine that the amount of available space in the storage components are low and determine that the threshold amount of time has expired. In another example, the data management system may determine that a shorter threshold amount of time for biometric data which may have a higher privacy risk compared to voice data.

If the data management system determines that threshold amount of time has not expired, the process may return to block 92 to continue receiving and storing data. That is, the monitoring devices 28 may continuously generate data regarding the user and the data management system may continuously receive and/or retrieve the data for data management. The data management system may also continuously delete data from the third-party system 32 to limit the storage of data outside the data management system.

In certain embodiments, the data management system may determine that the threshold amount of time expired and analyze the data associated with the user information. At block 98, the data management system may retrieve the data associated with the user from the storage component (e.g., database, cloud storage). The data management system may further organize the data according to a particular attribute (e.g., date, location, objects) for the user to view through the portal or the application on the user device 26. For example, the user may capture duplicate data (e.g., multiple images or videos) on a certain date to document a special occasion. In another example, the user may have multiple monitoring devices 28 that all generated data for a certain date. As such, the data management system may organize all data collected on a certain date for analysis or for displaying to the user. Additionally or alternatively, the data management system may determine that the duplicate data may not provide additional information or objects of interest and delete the data to free up space in the storage components.

Further, the data management system may analyze the data for privacy or security risks. As described herein, the data management system may determine if individual data or the combination of data may allow an unauthorized party to identify the user. That is, the data management system may assign a risk value to the data within the system. The risk value may be determined by factors including a likelihood of the data to be identifying, a severity if the data is identifying (e.g., low sensitivity, high sensitivity), and a storage method for the data (e.g., encrypted, obscured). In certain embodiments, the collection and storage of data from one or more monitoring devices 28 may create privacy and security risks for the user. For example, the user may have two monitoring devices 28 including a Ring doorbell and a fitness tracker. The combination of image and location data from the Ring doorbell with the biometric data from the fitness tracker may allow third-parties to determine sensitive information (e.g., health, fitness, PII) of the user. As such, the improper maintenance of this data to third-parties may create privacy or security risks for the user.

If the risk value indicates that the data may be identifying, at block 102, the data management system may flag the user information associated with the data. That is, the data management may determine if individual data may be identifying and/or the aggregation of data within the system may be identifying. The data management system may flag the user account, the piece of identifying data, or the aggregation of identifying data. The data management system may notify the user of the flagging via the portal or the application on the user device 26. The data management system may further notify the user of the data creating the risk, the overall risk value, and identify one or more ways to lower the risk. For example, the user may have identifying information that is unencrypted in the storage components. The data management system may determine that encrypting or obscuring certain data may lower the overall risk. As such, the user may change their settings to require the data management system to encrypt all data before storage to lower the overall risk. In another example, the data management system may ask the user to change certain preferences of their account, such as decreasing the threshold amount of time, encrypting or obscuring user data, changing a username. For example, the data management system may identify fitness data or location data of the user that should be encrypted to decrease the risk value. As such, the data management system may suggest to the user to change their preferences regarding data storage. In another embodiment, the user may decide that the data may be outdated or no longer needed. The data management system may purge the data to reduce the overall risk value based on the aggregated data. Additionally or alternatively, the data management system may determine purging the data may successfully eliminate the identifying data, and therefore eliminate the risk.

At block 104, the data management system purge the data from the system. The data management system may determine that purging the data may eliminate the risk since there is less data available to identify the user. For example, the data management system may identify certain data that create the greatest risk for the user and flag the certain data to the user. The user determine that storing the data may not be useful since the data is outdated or irrelevant. As such, the data management system may delete the data from the system. In another example, the user may prefer to have data deleted periodically (e.g., once a month, once a year) to reduce risk and free up storage space. As such, the data management system may purge the data according to the user preference accumulation of too much data in the databases 34. Accordingly, the data management system may manage the storage and protection of data generated by the monitoring devices 28.

Although the example process described in FIG. 3 is described in a particular order, it should be noted that the example process 90 may be performed in any suitable order and is not limited to the order presented herein. It should also be noted that although each processing block is described below is the example process 90 as being performed by the data management system (e.g., computing system 10), other suitable computing systems may perform the process described herein.

Figure 4:
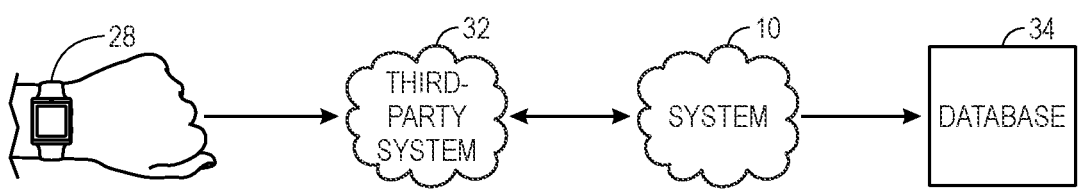
FIG. 4 is a schematic illustration of data management with respect to the example process of FIG. 3, in accordance with an embodiment.

With the foregoing in mind, FIG. 4 illustrates a flow diagram of an embodiment for receiving and managing data generated by the monitoring devices 28. The user may have one or more monitoring devices 28 that generate data about the user or their property. In the illustrated embodiment, the monitoring device 28 includes a fitness tracker, a health monitoring device, or a smart watch. The monitoring device 28 may generate data about its wearer (e.g., the user), including but not limited to biometric data (e.g., heart rate, sleep, blood oxygen, exercise), sound data (e.g., voice recordings, requests to digital advisors), location data (e.g., GPS), and financial data (e.g., credit card, bank account). The monitoring device 28 may collect the data based on certain user preferences. For example, the user may be interested in tracking a workout and indicate the type of workout to the monitoring device 28. The monitoring device 28 may also generate GPS data and monitoring a heart rate during the workout. If the user is not interested in tracking their heart rate, the user may indicate this to the monitoring device 28 and the device 28 may not generate such data.

In the illustrated embodiment, the monitoring device 28 may transmit the generated data to the third-party system 32 for storage. The monitoring device 28 may be associated with a third-party, such as a manufacturer of the monitoring device 28. In some embodiments, the manufacturer may have their own server or cloud storage for data storage. For example, a Google home may transmit data to the Google Cloud for storage. In other embodiments, the manufacturer may utilize a web service for data storage that is the manufacturer may rent or lease a part of server of another third-party. The monitoring device may generate data associated with the user and transmit it to a web service owned by a third-party resulting in the data passing through additional parties before reaching the third-party system 32. For example, the third-party system 32 may include Amazon Web Services or Google Cloud rather than maintaining their own storage system. The web services may cater to a plurality of third-parties and may have greater security risks.

The data management system may reduce these risks by managing the data within the third-party system 32. In an embodiment, the data management system may instruct the third-party system 32 on data storage procedures. For example, the data management system may analyze the data stored in the third-party system 32 to determine the presence of privacy or security risk. As described herein, the data management system may determine the risk value of the data and also determine one or more ways to mitigate the risks. In certain embodiments, the data management system may determine the risk of the data stored within the third-party system 32. For example, the data management system may take into consideration the likelihood the data may be exposed to unauthorized parties (e.g., security breach, data leak), the severity if the data is leaked (e.g., identifying), the type of data stored (e.g., high sensitivity, low sensitivity), and the storage method (e.g., encrypted, obscured). In certain embodiments, the data management system may require all data stored on the third-party system 32 to be encrypted or obscured to reduce an overall risk.

In the illustrated embodiment, the data management system may retrieve data from the third-party system 32 for storage within the system. The data management system may communicate with the third-party system 32 to retrieve the data associated with the user within the third-party system 32. That is, the system may periodically retrieve and purge the data from the third-party system 32 to reduce the number of storage locations. The system may output an indication to the third-party system 32 indicative of instructions to delete all data associated with a user. Accordingly, the data management system may monitor the privacy of the user by managing the generation, collection, and analysis of data created by monitoring devices 28 of third-parties.

Figure 5:
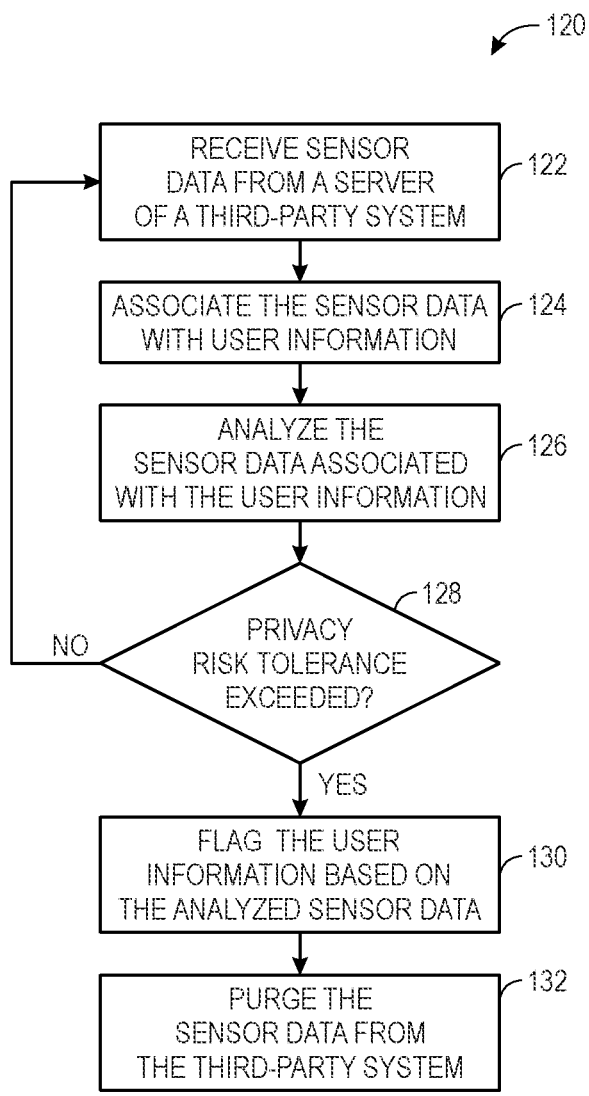
FIG. 5 is a flow diagram of an example process of managing data within the data management system, in accordance with an embodiment.

With the foregoing in mind, FIG. 5 illustrates an example process 120 for managing the data associated with the user created by monitoring devices 28 of the user. The monitoring devices 28 may transmit the data to the associated third-party system 32 and the data management system may retrieve data (e.g., sensor data) for analysis. The generation and aggregation of data from multiple sources (e.g., monitoring devices 28) may create privacy and security risks for the user. As such, it may be beneficial for the data management system to receive or retrieve data, analyze the data, and determine an overall privacy risk associated with the data. The data management system (e.g., computing system 10) may perform operations described below via the processor 14 based on processor-executable code stored in the memory 16 and the storage 18. The processor 14 may execute the processor-executable code to analyze the data and determine the presence of privacy or security risks. Based on determination and analysis, the processor 14 may communicate with the data management system to flag a user account and purge the data from storage.

At block 122, the data management system may retrieve data stored in a server or database of a third-party system 32. For example, the user may install a plurality of monitoring devices 28 within their property that generate data about the property and the inhabitants. The data may include image data, video data, location data, and/or sound data about the property and its residents. For example, the monitoring devices 28 may include a home security camera, a smart home device, and a fitness device. The home security camera may generate image data or video data for a view (e.g., front door, backyard, driveway) of the property. The smart home device may capture voice data requests of the user and may determine different habits of the user based on the request. The fitness device may generate biometric data about the user, such as heart rate, sleep, blood oxygen, workouts, calories burned, etc. In certain embodiments, the monitoring devices 28 may store data within the device 28 (e.g., memory, processor) before transmitting the data. In other embodiments, the monitoring devices 28 may be associated with a respective third-party system 32 that includes a storage component capable of receiving and storing user data. The plurality of monitoring devices 28 may transmit the data to one or more third-party systems 32 for storage. As such, the data management system may access multiple third-party systems 32 to retrieve the data on behalf of the user.

At block 124, the data management system may associate the data with user information. The data management system may store user information (e.g., user account, user settings, additional data) within the database 34 or cloud storage 36. For example, the user may navigate to the portal of the system, a web application, or the application on the user device 26 and enter user information. For example, the user may create a user account within the system by setting a username and password, cataloguing one or more monitoring devices 28, and adding one or more third-party subscriptions. Further, the user account may hold one or more preferences of the user, such as a threshold amount of time, encryption or obscure options, storage options, or the like. The user may also include a type of monitoring device 28, including an associated SKU or product number, the third-party provider or manufacturer, and a type of data generated. The data management system may create an account on behalf of the user within the third-party system 32 for the monitoring device 28. As such, the data management system may link the account within the third-party system 32 with the user information of the system. Further, system may retrieve data from the third-party system 32 and associate it with the user account of the system. In some embodiments, the data management system may purge the data from the third-party system 32 after retrieving it. In other embodiments, the user may specify the method of data deletion from the third-party system 32. For example, the user may indicate in the user preferences that data may be deleted from the third-party system 32 every three months. In another embodiment, the user may indicate through the portal or the application on the user device 26 that data may be deleted.

At block 126, the data management system may analyze the data associated with the user information. The data management system may identify objects of interest as discussed in FIG. 2. Additionally or alternatively, the system may determine if these objects contain PII or may be combined to form PII. The data management system may determine a privacy risk (e.g., risk value) for individual pieces of data and/or the aggregation of data within the system. That is, the system may determine if the data or the combination of data may allow an unauthorized party identify the user. In an embodiment, the data management system may analyze individual data to determine the risk value. The risk value may be determined by factors including a likelihood of the data to be identifying, a severity if the data is identifying (e.g., low sensitivity, high sensitivity), and a storage method for the data (e.g., encrypted, obscured). For example, image data may be more likely to be identifying if exposed to unauthorized parties, but the severity may be low because the data may not be sensitive. In another example, biometric data may be less likely to be identifying, but the severity may be high if exposed. The risk value may be lowered by encrypting or obscuring the data before storage. Still in another example, voice data may be less likely to be identifying and the severity may be low. As such, the data may be stored within the system without being encrypted or obscured.

In certain embodiments, the data management system may also determine an overall risk value for the data of the user that is stored in the system. Indeed, the aggregation or combination of data may introduce a risk (e.g., privacy or security) that may not be present in individual data. For example, the data management system may receive location data from a wearable device and video data from a smart home device that are associated with the user account. The user account may also include a username chosen by the user that contains identifying information, such as a first name, last name, year of birth, or location. The combination of the location data, the video data, and the identifying username may be identifying if exposed to unauthorized parties. In another example, the data management system may also scrape the Internet or Intranet for data that may be publically available, such as a Facebook page, a LinkedIn profile, a Strava account, or the like. The data management system may also access data shared within third-party applications, such as Strava runs, fitness device competitions, or FitBit competitions. The data management system may analyze the public data and the data within the system to determine an overall privacy risk.

For example, the combination of a GPS location, an identifying username (e.g., includes a first name, last name, date), and image data with the face of the user may allow an unauthorized party to identify the user which may be indicative of a high overall privacy risk. In another example, the combination of a GPS location, an identifying username, and encrypted image data may not create a privacy risk if the unauthorized party may not identify the user. In another embodiments, the data management system may determine the overall risk value for the data stored in the third-party system 32 and transmit a signal indicative of instructions to manage the data based on the risk value determination.

The public data may include the sensor data that is publically shared based on the settings of the user and/or the monitoring device via the third-party system. For example, a user fitness device may include public sharing of an anonymous user ID (e.g., LovestoRun123) along with location data of completed runs or in progress runs. However, an analysis of a starting point of a group of publically-shared runs from a single residential location or geographic area can identify a privacy risk. Further, if the user also has a doorbell camera associated with the same residential location that does not share the same user name but that provides data to a public neighborhood watch system, the doorbell camera nonetheless can be linked to the fitness device user. The linking provides an additional security risk for capturing image data of the user while leaving and information about when the user is likely to be out of the house.

In another example, the security risks can change based on based on the emergence of security breaches, which can change the status of personal data changes from locally stored to public facing. The system can dynamically evaluate risks pre and post breach for aggregated data.

Additionally or alternatively, the system may receive certain preferences of the user, such as instructions to modify, obscure, or eliminate faces in image or video data, or voices in audio data. That is, the user may want more or less privacy for their data by indicating certain preferences in the user information. For example, the user may want to protect the privacy of their children and request the system to obscure the faces of the children found in the data. In another example, the user may want to share their data with family or friends. As such, the user may indicate this preference to the system and have a select group of devices or usernames that data may be shared with. Accordingly, the user may maintain control over the management and storage of their data.

At block 128, the data management system may determine if there is a risk tolerance that has been exceeded based on the risk value. That is, the system may determine whether any individual piece of data may be identifying and/or the combination of the data within the system may be identifying. For example, the data management system may receive location data from a wearable device and video data from a smart home device that are associated with the user account. The individual data (e.g., location data, video data) may have a low risk value, meaning the data may not be identifying of the user. However, the data may be stored in a user account with a publically searchable username with identifying information, such as a first name, last name, year of birth, or location. The combination of the location data, the video data, and the identifying username may allow a third-party to determine the identity of the user. As such, the risk tolerance for the combination of the data may be exceeded. Thus, in one example, the risk tolerance determination threshold may be based on an accumulated count of personal data being above a preset value. In another example, the risk tolerance determination may be a truth table in which a presence of both current location and one or more of first name, last name, year of birth, or residence address in aggregated sensor data triggers an indication that a risk tolerance is exceeded. In an embodiment, first sensor data is from a first monitoring device and second sensor data is from a second monitoring device. In isolation, the first sensor data or the second sensor data are not a security risk. However, when aggregated, the first sensor data combined with the second sensor data can be considered to exceed a risk tolerance.

In certain embodiments, the risk value may indicate that the data is not identifying of the user if accessed by unauthorized parties. The data management system may continuously receive data from the monitoring devices 28, store the data, and analyze it for new privacy or security risks. As such, the process 120 may return to block 122 to continue receiving or retrieving data from associated third-party systems 32.

If the risk value exceeds the risk tolerance, the data management system may flag the user information associated with the data. At block 130, the data management system may flag the user information in response to determining the risk value exceeded the risk tolerance and notify the user of the flagging. That is, the data management system may determine that the aggregated data may be used to identify the user and notify the user to mitigate the risk. The data management system may notify the user of the flagging, the overall privacy risk, and identify measures to lower the overall risk. For example, the data management system may display a message to the user via the display 22 or on a display of the user device 26 indicative of the flagging. The data management system may identify one or more ways to lower the risk. For example, the system may ask the user to change one or more preferences to include encrypting or obscuring more data before storage. In another example, data management system may ask the user to change certain preferences of their account, such as decreasing the threshold amount of time, encrypting or obscuring user data, changing a user name, or the like. The data management system may further determine data that may be outdated (e.g., past a certain time interval) and delete the data to reduce the overall risk value.

At block 132, the data management system may purge the data stored in the system. For example, the data management system may purge the data to eliminate or reduce the overall risk. That is, a reduction in the amount of data about a user may make it more difficult to for identification. As such, an overall privacy risk may be reduced. In certain embodiments, the data management system may perform this analysis for the data within the third-party server 32 and output instructions indicative of the risk value determination. In other embodiments, the data management system may periodically purge data from both the system and the third-party system 32 based on the preferences of the user. For example, the user may want to limit the amount of data stored by the third-party system 32 and indicate to the data management system to purge the data from the third-party system 32 ever two weeks. In another example, the user may decide that the data within the system may no longer be useful for analysis and indicate to the system to purge the data within a certain time interval.

Although the example process described in FIG. 5 is described in a particular order, it should be noted that the example process 120 may be performed in any suitable order and is not limited to the order presented herein. It should also be noted that although each processing block is described below is the process 120 as being performed by the data management system (e.g., computing system 10), other suitable computing systems may perform the process described herein. The computing system 10 may analyze the retrieved data to determine the presence of privacy or security risks.

Figure 6:
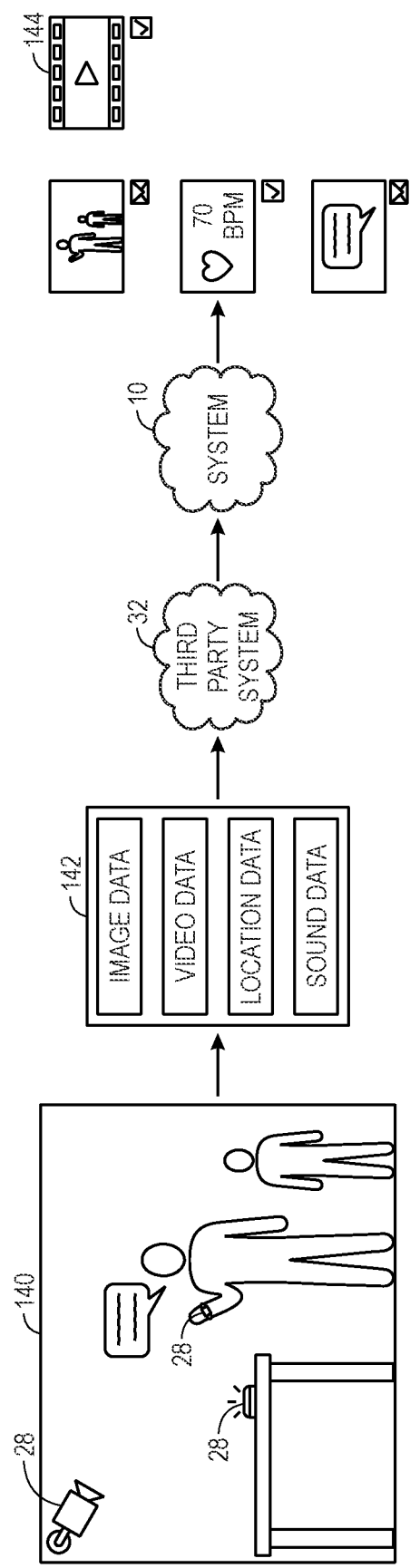
FIG. 6 is a schematic illustration of data management with respect to the example process of FIG. 5, in accordance with an embodiment.
Figure 7:
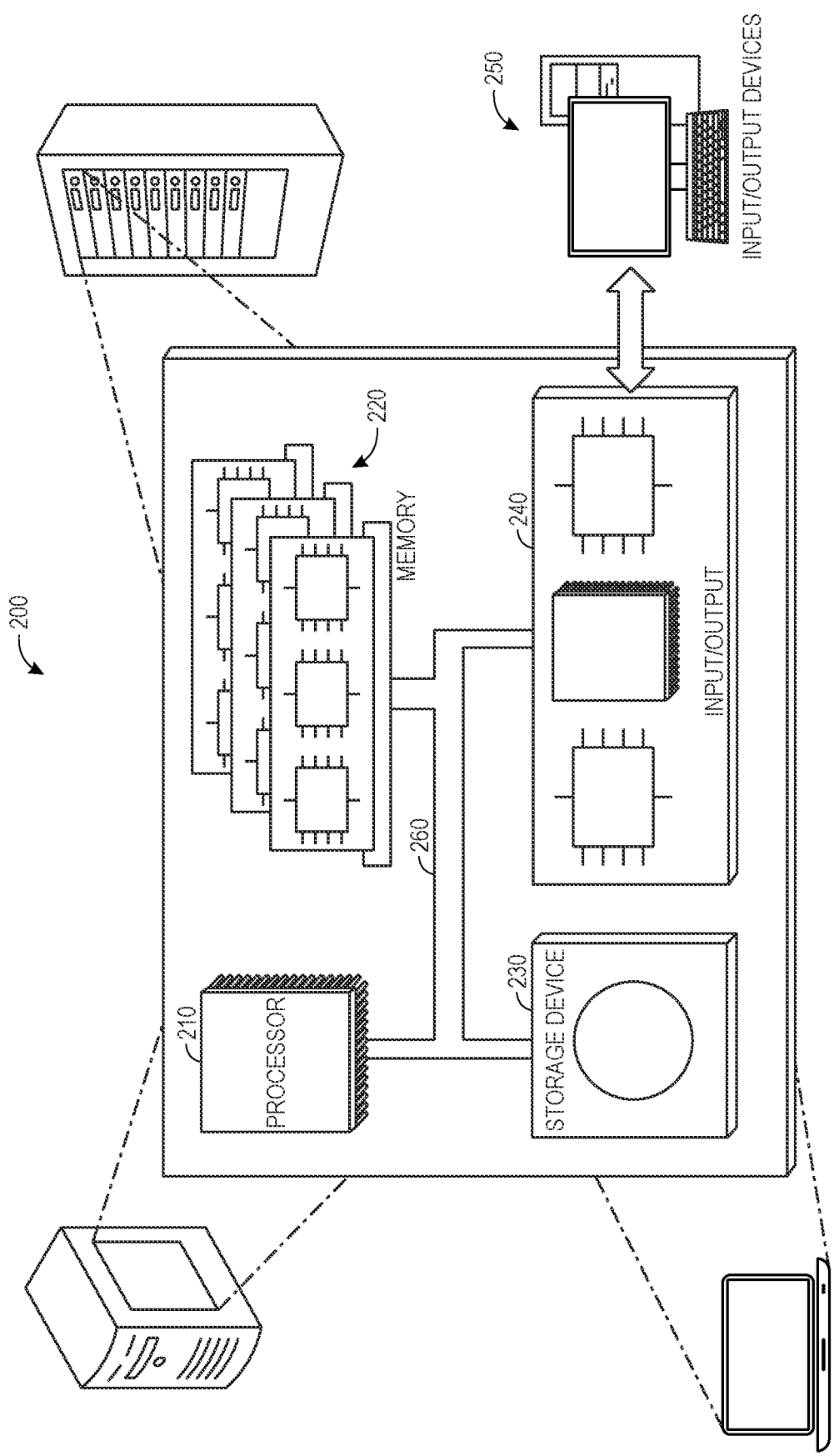
FIG. 7 is a schematic illustration of an example computing system that may be used in conjunction with the disclosed techniques, in accordance with an embodiment.

FIG. 6 illustrates a flow diagram of an embodiment for collecting and managing data regarding the user generated by the monitoring devices 28. For example, the user may have a property 140 that includes one or more monitoring devices 28 with sensor(s) 30 that generate sensor data. In the illustrated embodiment, the monitoring devices 28 include a security camera or a smart home camera (e.g., Nest camera), a smart home device (e.g., Alexa, Siri), and wearable device (e.g., FitBit, smart watch, Garmin watch). The monitoring devices 28 may generate sensor data 142, including but not limited to image data, video data, location data, and sound data that is about the user. In certain embodiments, the monitoring devices 28 may directly transmit the sensor data to an associated third-party system 32. For example, the smart watch may transmit the biometric data, sound data, location data, or image data of its wearer to a third-party system for storage. In another example, the Alexa may store voice data or habit data of the user in the Amazon Cloud server. As such, the data management system may communicate with the associated third-party system 32 to receive the user data, analyze the user data, and/or purge the sensor data 142 on within the third-party system 32. For example, the data management system may retrieve sensor data 142 from the system and the Amazon Cloud server on behalf of the user. The data management system may also immediately purge the sensor data 142 from the third-party system 32 to limit the number of locations that sensor data 142 may be stored. The data management system may also analyze the sensor data 142 to determine certain attributes 144 (e.g., objects of interest, risk value) and isolate them for the user. In some embodiments, the data management system may be configured to identify the attributes 144 and determine that the sensor data 142 contains objects of interest. In the illustrated embodiment, the data management system isolated the attributes 144 and displayed them on a display (e.g., display 22, display of the user device 26). The user may view the isolated attributes 144 by accessing the data management system via the portal or the application on the user device 26. The user may select (e.g., accept, encrypt, obscure, delete) certain attributes 144 from the sensor data 142 before the system stores the data. In this way, the data management system may create an arm's length transaction between the user and the third-party system 32 by managing the sensor data 142 for the user.

FIG. 10 illustrates an example computing system 200 that the embodiments described herein may use to perform their respective operations. The system 200 may be used for any of the operations described with respect to the various embodiments described herein, including the data management system 200 described herein. For example, the system 200 may be included, at least in part, in one or more of computing device(s) or system(s) described herein. In certain embodiments, the system 200 may include one or more processors 210, one or more memory 220, one or more storage devices 230, and one or more input/output (I/O) devices 250 controllable via one or more I/O interfaces 240. The various components 210, 220, 230, 240, or 250 may be interconnected via at least one system bus 260, which may enable the transfer of data between the various modules and components of the system 200.

In certain embodiments, the processor(s) 210 may be configured to process instructions for execution within the system 200. The processor(s) 210 may include single-threaded processor(s), multi-threaded processor(s), or both. The processor(s) 210 may be configured to process instructions stored in the memory 220 or on the storage device(s) 230. For example, the processor(s) 210 may execute instructions for the various software module(s) described herein. The processor(s) 210 may include hardware-based processor(s) each including one or more cores. The processor(s) 210 may include general purpose processor(s), special purpose processor(s), or both.

In certain embodiments, the memory 220 may store information within the system 200. In certain embodiments, the memory 220 includes one or more computer-readable media. The memory 220 may include any number of volatile memory units, any number of non-volatile memory units, or both volatile and non-volatile memory units. The memory 220 may include read-only memory, random access memory, or both. In certain embodiments, the memory 220 may be employed as active or physical memory by one or more executing software modules.

In certain embodiments, the storage device(s) 230 may be configured to provide (e.g., persistent) mass storage for the system 200. In certain embodiments, the storage device(s) 230 may include one or more computer-readable media. For example, the storage device(s) 230 may include a floppy disk device, a hard disk device, an optical disk device, or a tape device. The storage device(s) 230 may include read-only memory, random access memory, or both. The storage device(s) 230 may include one or more of an internal hard drive, an external hard drive, or a removable drive.

One or both of the memory 220 or the storage device(s) 230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 200. In certain embodiments, the CRSM may include a data store that provides storage of computer-readable instructions or other information in a non-transitory format. The CRSM may be incorporated into the system 200 or may be external with respect to the system 200. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 210 and the memory 220 may be supplemented by, or incorporated into, one or more application-specific integrated circuits (ASICs).

In certain embodiments, the system 200 may include one or more I/O devices 250. The I/O device(s) 250 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 250 may also include one or more output devices such as a display, LED(s), an audio output device (e.g., a speaker), a printer, a haptic output device, and so forth. The I/O device(s) 250 may be physically incorporated in one or more computing devices of the system 200 or may be external on one or more computing devices of the system 200.

In certain embodiments, the system 200 may include one or more I/O interfaces 240 to enable components or modules of the system 200 to control, interface with, or otherwise communicate with the I/O device(s) 250. The I/O interface(s) 240 may enable information to be transferred in or out of the system 200, or between components of the system 200, through serial communication, parallel communication, or other types of communication. For example, the I/O interface(s) 240 may comply with a version of the RS-1032 standard for serial ports, or with a version of the IEEE AA884 standard for parallel ports. As another example, the I/O interface(s) 240 may be configured to provide a connection over Universal Serial Bus (USB) or Ethernet. In certain embodiments, the I/O interface(s) 240 may be configured to provide a serial connection that is compliant with a version of the IEEE AA994 standard.

In certain embodiments, the I/O interface(s) 240 may also include one or more network interfaces that enable communications between computing devices in the system 200, or between the system 200 and other network-connected computing systems. The network interface(s) may include one or more network interface controllers (NICs) or other types of transceiver devices configured to send and receive communications over one or more communication networks using any network protocol.

Computing devices of the system 200 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 200 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 200 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 200 that includes a back-end component, e.g., as a data server, or that includes a middleware component, e.g., an application server, or that includes a front-end component, e.g., a client computer having a graphical user interface or a web browser through which a user may interact with an with the system 200, or any appropriate combination of one or more such back-end, middleware, or front end components. The components of the system 200 may be interconnected by any appropriate form or medium of digital data communication, e.g., a communication network. Examples of communication networks include a local area network ("LAN") and a wide area network ("WAN"), e.g., the Internet.

In certain embodiments, the computing system 200 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as sensor data stored in the database.

The techniques and methods described herein may be applied to other systems that gather and store data. For example, it can also be applied to environments such as cars, public transportation systems, commercial buildings, and underground or underwater networks.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A data management system, the system comprising:
   a monitoring device, operated by a user, comprising a sensor, wherein the sensor generates sensor data from an environment of the sensor and transmits the sensor data to a third-party system operated by a third-party;
   a computing device, operated by a service provider that the user has established a user account with, comprising:
      a memory storing executable instructions; and
      a processor configured to execute the instructions to:
         retrieve the sensor data from the third-party system;
         responsive to retrieving the sensor data, associate the sensor data with the user account based on a comparison between the monitoring device and a stored list of monitoring devices associated with the user account, wherein the user account comprises additional sensor data from other monitoring devices and such that the sensor data together with the additional sensor data comprises aggregated sensor data associated with the user account;
         determining that a user-configurable threshold amount of time has expired;
         in response to the user-configurable threshold amount of time expiring, determine a risk value of the aggregated sensor data;
         flag the user account in response to determining the risk value of the aggregated sensor data is greater than a risk threshold; and
         transmit a signal indicative of the flagged user account to an application of a user device, wherein the third-party is separate from the user and the service provider.

2. The system of claim 1, wherein the processor is further configured to execute instructions that operate to:
   retrieve the sensor data from the monitoring device; and
   populate fields of a database based on the sensor data.

3. The system of claim 2, wherein the processor is further configured to execute instructions that operate to:
   retrieve the populated fields from the database;
   aggregate the retrieved populated fields with the additional sensor data to generate the aggregated sensor data;
   determine the risk value is greater than the risk threshold based on the aggregated, retrieved sensor data; and
   purge the populated fields from the database.

4. The system of claim 2, wherein the risk value is determined based on a type of the sensor data, a severity of the sensor data, a storage method of the sensor data, and a likelihood of exposure.

5. The system of claim 1, wherein the processor is further configured to execute instructions that operate to:
   determine a storage method for the sensor data based on one or more user preferences associated with the user account, wherein the storage method comprises encrypting or obscuring the sensor data;
   encrypt or obscure the sensor data based on the one or more user preferences; and
   populate one or more fields of a database based on the encrypted or obscured sensor data.

6. The system of claim 5, wherein the processor is further configured to execute instructions that operate to:
   aggregate the sensor data;
   determine the risk value is greater than the risk threshold based on the aggregated sensor data; and
   transmit a second signal indicative of instructions to purge the sensor data to the third-party system.

7. The system of claim 5, wherein the system comprises the application of the user device, a portal, or a website for the user to update the user account and view the one or more fields of the database.

8. The system of claim 1, wherein the processor is further configured to execute instructions that operate to:
   encrypt the sensor data in response to determining the risk value of the sensor data is greater than the risk threshold; and
   determine the risk value of the aggregated sensor data.

9. The system of claim 1, wherein the processor is further configured to execute instructions that operate to:
   flag the sensor data in response to determine an additional risk value of the sensor data is greater than an additional risk threshold; and
   transmit a second signal indicative of the flagged sensor data to the application of the user device.

10. The system of claim 1, wherein the user account is stored in a database.

11. The system of claim 1, wherein the processor is further configured to execute instructions that operate to:
    receive an indication via the application of the user device indicative of an additional monitoring device associated with the user account; and
    update the stored list of monitoring devices based on the indication.

12. The system of claim 1, wherein the processor is further configured to execute the instructions that operate to retrieve the sensor data from the third-party system by:
    access a server associated with the third-party system; or
    access a memory of the monitoring device.

13. The system of claim 1, wherein the processor is further configured to execute the instructions that operate to retrieve the sensor data from the third-party system by:
    identify one or more objects of interest within the sensor data; and
    obscuring the one or more objects of interest based on user preferences associated with the user account.

* * * * *